United States Patent
Zhao et al.

(10) Patent No.: US 10,701,358 B2
(45) Date of Patent: Jun. 30, 2020

(54) MODE DEPENDENT PRIMARY AND SECONDARY TRANSFORMS

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/206,109

(22) Filed: Nov. 30, 2018

(65) Prior Publication Data

US 2020/0014924 A1    Jan. 9, 2020

Related U.S. Application Data

(60) Provisional application No. 62/695,395, filed on Jul. 9, 2018.

(51) Int. Cl.
| | |
|---|---|
| *H04N 19/176* | (2014.01) |
| *H04N 19/159* | (2014.01) |
| *H04N 19/593* | (2014.01) |
| *H04N 19/11* | (2014.01) |
| *H04N 19/61* | (2014.01) |
| *H04N 19/46* | (2014.01) |
| *H04N 19/12* | (2014.01) |

(52) U.S. Cl.
CPC ........... *H04N 19/12* (2014.11); *H04N 19/159* (2014.11); *H04N 19/176* (2014.11); *H04N 19/46* (2014.11)

(58) Field of Classification Search
CPC .... H04N 19/12; H04N 19/159; H04N 19/176; H04N 19/46
USPC ......................................................... 375/240
See application file for complete search history.

(56) References Cited

U.S. PATENT DOCUMENTS

| | | | |
|---|---|---|---|
| 2017/0272745 A1* | 9/2017 | Liu | H04N 19/107 |
| 2017/0332084 A1* | 11/2017 | Seregin | H04N 19/159 |
| 2018/0098064 A1* | 4/2018 | Seregin | H04N 19/11 |
| 2019/0007682 A1* | 1/2019 | Kanoh | H04N 19/12 |

* cited by examiner

*Primary Examiner* — Susan E. Hodges
(74) *Attorney, Agent, or Firm* — Sughrue Mion, PLLC

(57) ABSTRACT

A method and apparatus for signaling a transform type used to encode a current block in an encoded video bitstream includes determining an intra prediction mode of the current block, and determining whether the intra prediction mode satisfies a predetermined condition, wherein in response to determining that the predetermined condition is satisfied, the transform type is signaled in the encoded video bitstream, and in response to determining that the predetermined condition is not satisfied, the transform type comprises a default transform type, and the transform type is not signaled in the encoded video bitstream.

21 Claims, 6 Drawing Sheets

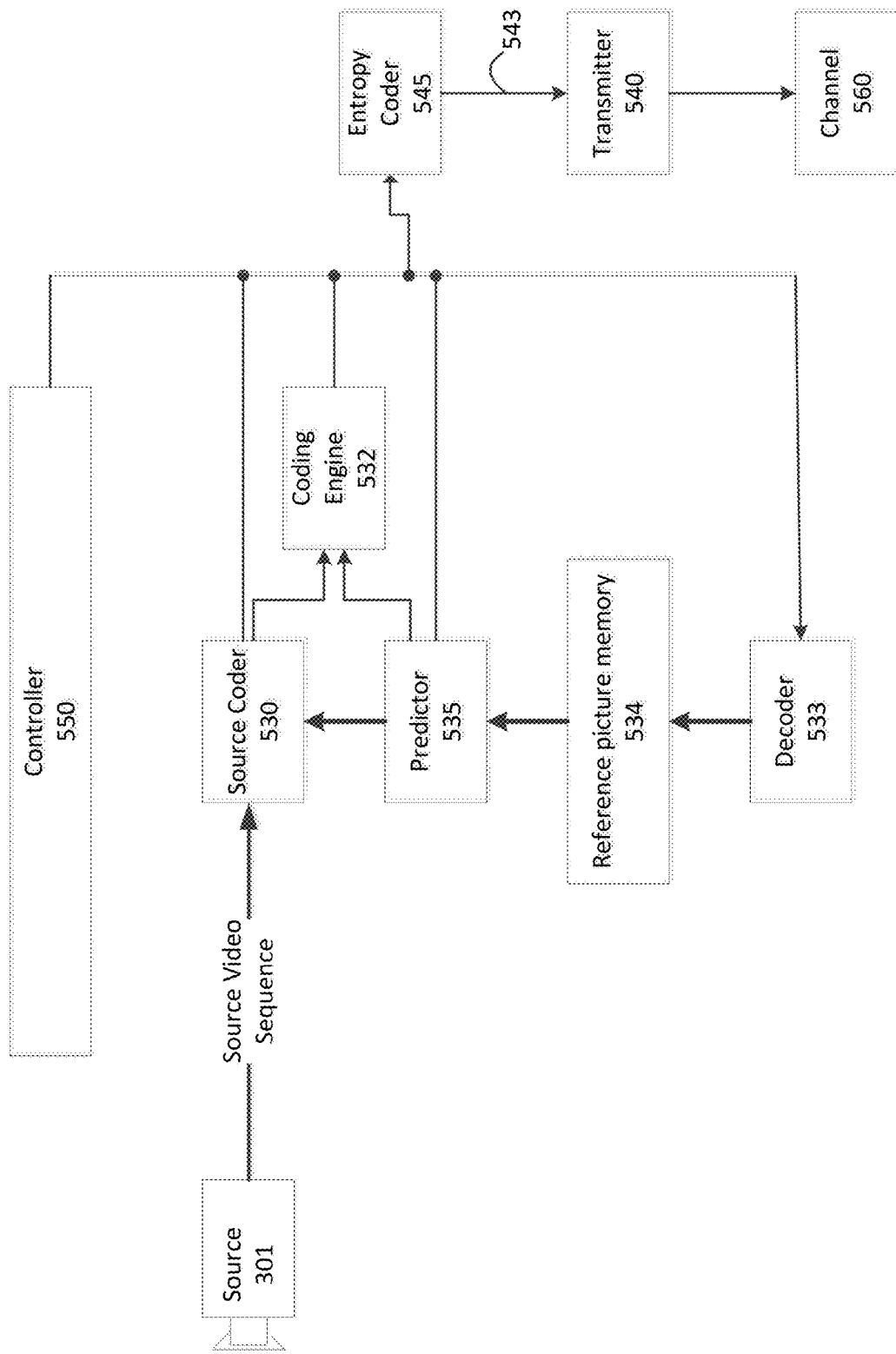
FIG. 5    Encoder 303

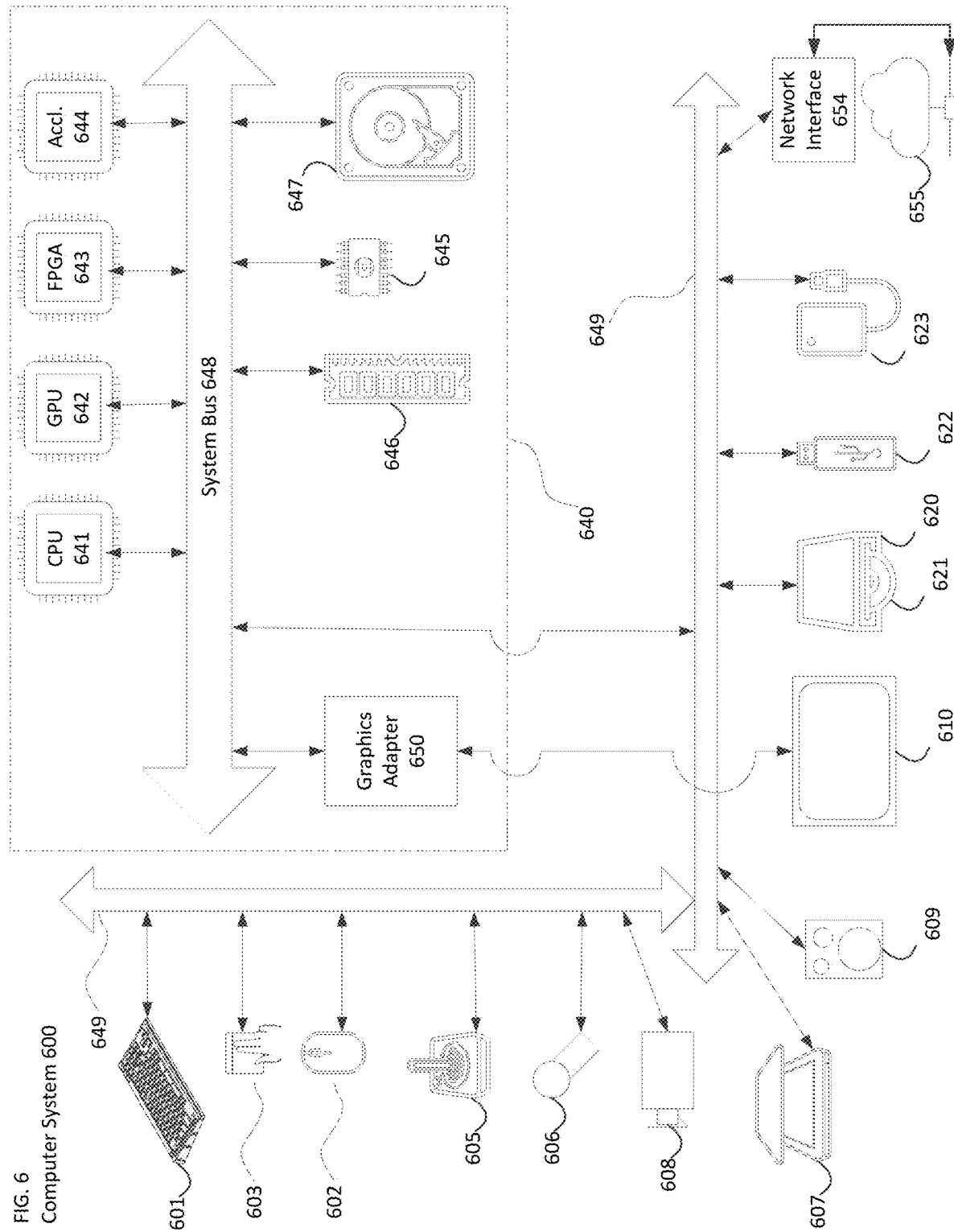

MODE DEPENDENT PRIMARY AND SECONDARY TRANSFORMS

CROSS-REFERENCE TO RELATED APPLICATION

This application claims priority under 35 U.S.C. § 119 to U.S. Application No. 62/695,395, filed on Jul. 9, 2018, in the United States Patent & Trademark Office, the disclosure of which is incorporated herein by reference in its entirety.

FIELD

This disclosure is directed to the next-generation video coding technologies beyond High Efficiency Video Coding (HEVC), such as, for example, Versatile Video Coding (VVC). More specifically, the present disclosure is directed to a mode dependent primary and secondary transform scheme.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then, the potential need has been studied for standardization of future video coding technology with a compression capability that significantly exceeds that of the HEVC standard (including its extensions).

In October 2017, a Joint Call for Proposals on Video Compression with Capability beyond HEVC (CfP) was issued. By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. With careful evaluation, JVET formally launched the standardization of next-generation video coding beyond HEVC, i.e., the so-called Versatile Video Coding (VVC).

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU. In HEVC, a CU or a TU can only be square shape, while a PU may be square or rectangular shape for an inter predicted block. In later stage of HEVC some contributions proposed to allow rectangular shape PUs for intra prediction and transform. These proposals were not adopted to HEVC but extended to be used in JEM.

At picture boundary, HEVC imposes implicit quad-tree split so that a block will keep quad-tree splitting until the size fits the picture boundary.

Under the development of VVC, 65 angular directions are proposed, to accommodate the increased number of directional intra modes, an intra mode coding method with 6 Most Probable Modes (MPMs) is used. Two major technical aspects are involved: 1) the derivation of 6 MPMs, and 2) entropy coding of 6 MPMs and non-MPM modes. In the JEM, the modes included into the MPM lists are classified into three groups, neighbor intra modes, derived intra modes, and default intra modes.

Five neighboring intra prediction modes are used to form the MPM list. If the MPM list is not full (i.e., there are less than 6 MPM candidates in the list), derived modes are added; these intra modes are obtained by adding −1 or +1 to the angular modes that are already included in the MPM list. Such additional derived modes are not generated from the non-angular modes (DC or planar). Finally, if the MPM list is still not full, the default modes are added in the following order: vertical, horizontal, mode 2, and diagonal mode. As a result of this process, a unique list of 6 MPM modes is generated.

The coding for selection of the remaining 61 non-MPMs is done as follows. The 61 non-MPMs are first divided into two sets: a selected mode set (secondary MPM) and a non-selected mode set. The selected modes set contains 16 modes and the rest (45 modes) are assigned to the non-selected modes set. The mode set that the current mode belongs to is indicated in the bitstream with a flag. If the mode to be indicated is within the selected mode set, the selected mode is signaled with a 4-bit fixed-length code, and if the mode to be indicated is from the non-selected set, the selected mode is signaled with a truncated binary code.

In addition to DCT-II and 4×4 DST-VII which have been employed in HEVC, an Adaptive Multiple Transform (AMT, or as known as Enhanced Multiple Transform (EMT)) scheme is used for residual coding for both inter and intra coded blocks. It uses multiple selected transforms from the DCT/DST families other than the current transforms in HEVC. The newly introduced transform matrices are DST-VII, DCT-VIII, DST-I and DCT-V. Table shows the basis functions of the selected DST/DCT.

TABLE 1

Transform basis functions of DCT-II/V/VIII and DST-I/VII for N-point input

| Transform Type | Basis function $T_i(j)$, i, j = 0, 1, ..., N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ |
| | where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, |
| | where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |

TABLE 1-continued

Transform basis functions of DCT-II/V/VIII and DST-I/VII for N-point input

| Transform Type | Basis function $T_i(j)$, i, j = 0, 1, ..., N − 1 |
|---|---|
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC, with 10-bit representation instead of 8-bit in HEVC. To keep the intermediate values of the transformed coefficients within the range of 16-bit, after horizontal and after vertical transform, all the coefficients are right shifted by 2 more bits, comparing to the right shift used in the current HEVC transforms.

The AMT applies to the CUs with both width and height smaller than or equal to 64, and whether AMT applies or not is controlled by a CU level flag. When the CU level flag is equal to 0, DCT-II is applied in the CU to encode the residue. For luma coding block within an AMT enabled CU, two additional flags are signalled to identify the horizontal and vertical transform to be used. As in HEVC, the residual of a block can be coded with transform skip mode in the JEM. To avoid the redundancy of syntax coding, the transform skip flag is not signalled when the CU level AMT flag is not equal to zero.

For intra residue coding, due to the different residual statistics of different intra prediction modes, a mode-dependent transform candidate selection process is used. Three transform subsets have been defined as shown in Table, and the transform subset is selected based on the intra prediction mode, as specified in Table.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With the subset concept, a transform subset is first identified based on Table using the intra prediction mode of a CU with the CU-level AMT flag is equal to 1. After that, for each of the horizontal and vertical transform, one of the two transform candidates in the identified transform subset, according to in Table, is selected based on explicitly signalled with flags.

TABLE 3

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

For inter prediction residual, however, only one transform set, which consists of DST-VII and DCT-VIII, is used for all inter modes and for both horizontal and vertical transforms.

The complexity of AMT would be relatively high at the encoder side, since totally five (DCT-II and four multiple transform candidates) different transform candidates need to be evaluated with rate-distortion cost for each residual block when brute-force search is used. To alleviate this complexity issue at the encoder, several optimization methods are designed for algorithm acceleration in the JEM.

Under the development of VVC, a mode-dependent non-separable secondary transform (NSST) is proposed to locate between the forward core transform and quantization (at the encoder) and between the de-quantization and inverse core transform (at the decoder). To keep low complexity, NSST is only applied to the low frequency coefficients after the primary transform. If both width (W) and height (H) of a transform coefficient block is larger than or equal to 8, then 8×8 non-separable secondary transform is applied to the top-left 8×8 region of the transform coefficients block. Otherwise, if either W or H of a transform coefficient block is equal to 4, a 4×4 non-separable secondary transform is applied and the 4×4 non-separable transform is performed on the top-left min(8,W)×min(8,H) region of the transform coefficient block. The above transform selection rule is applied for both luma and chroma components.

Matrix multiplication implementation of a non-separable transform is described as follows using a 4×4 input block as an example. To apply the non-separable transform, the 4×4 input block X:

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Equation 1)}$$

is represented as a vector $\vec{X}$:

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \quad \text{(Equation 21)}$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. In JEM, a Hypercube-Givens Transform (HyGT) with butterfly implementation is used instead of matrix multiplication to reduce the complexity of non-separable transform.

There are totally 35×3 non-separable secondary transforms for both 4×4 and 8×8 block size, where 35 is the number of transform sets specified by the intra prediction mode, denoted as set, and 3 is the number of NSST candidate for each intra prediction mode. The mapping from the intra prediction mode to the transform set is defined in Table 4. The transform set applied to luma/chroma transform coefficients is specified by the corresponding luma/chroma intra prediction modes, according to Table 4. For intra prediction modes larger than 34 (diagonal prediction direction), the transform coefficient block is transposed before/after the secondary transform at the encoder/decoder.

For each transform set, the selected non-separable secondary transform candidate is further specified by the explicitly signalled CU-level NSST index. The index is signalled in a bitstream once per intra CU after transform coefficients and truncated unary binarization is used. The truncated value is 2 in case of planar or DC mode, and 3 for angular intra prediction mode. This NSST index is signalled only when there is more than one non-zero coefficient in a CU. The default value is zero when it is not signalled. Zero value of this syntax element indicates secondary transform is not applied to the current CU, values 1-3 indicates which secondary transform from the set should be applied.

In the JEM, NSST is not applied for a block coded with transform skip mode. When the NSST index is signalled for a CU and not equal to zero, NSST is not used for a block of a component that is coded with transform skip mode in the CU. When a CU with blocks of all components are coded in transform skip mode or the number of non-zero coefficients of non-transform-skip mode CBs is less than 2, the NSST index is not signalled for the CU.

For example, it is proposed to forbid mixing NSST and EMT when using QTBT—effectively enforcing NSST to only be used with DCT2 as primary transform.

TABLE 4

Mapping from intra prediction mode to transform set index

| intra mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 |
| intra mode | 34 | 35 | 36 | 37 | 38 | 39 | 40 | 41 | 42 | 43 | 44 | 45 | 46 | 47 | 48 | 49 | 50 | 51 |
| set | 34 | 33 | 32 | 31 | 30 | 29 | 28 | 27 | 26 | 25 | 24 | 23 | 22 | 21 | 20 | 19 | 18 | 17 |
| intra mode | 18 | 19 | 20 | 21 | 22 | 23 | 24 | 25 | 26 | 27 | 28 | 29 | 30 | 31 | 32 | 33 | | |
| set | 18 | 19 | 20 | 21 | 22 | 23 | 24 | 25 | 26 | 27 | 28 | 29 | 30 | 31 | 32 | 33 | | |
| intra mode | 52 | 53 | 54 | 55 | 56 | 57 | 58 | 59 | 60 | 61 | 62 | 63 | 64 | 65 | 66 | 67 (LM) | | |
| set | 16 | 15 | 14 | 13 | 12 | 11 | 10 | 9 | 8 | 7 | 6 | 5 | 4 | 3 | 2 | NULL | | |

A Hypercube-Givens Transform (HyGT) is used in the computation of the non-separable secondary transform. The basic elements of this orthogonal transform are Givens rotations, which are defined by orthogonal matrices G(m, n, θ), which have elements defined by $$G_{i,j}(m, n) = \begin{cases} \cos\theta, & i = j = m \text{ or } i = j = n, \\ \sin\theta, & i = m, j = n, \\ -\sin\theta, & i = n, j = m, \\ 1, & i = j \text{ and } i \neq m \text{ and } i \neq n, \\ 0, & \text{otherwise.} \end{cases} \quad \text{(Equation 3)}$$

HyGT is implemented by combining sets of Givens rotations in a hypercube arrangement. For example, assuming that N is a power of two, a HyGT round is defined as a sequence of log 2(N) passes, where in each pass, the indexes in vectors m and n are defined by edges of a hypercube with dimension log 2(N), sequentially in each direction.

To obtain good compression, more than one HyGT round are used. For example, a full non-separable secondary transform is composed of R rounds HyGT, and may include an optional permutation pass, to sort transform coefficients according to their variance. In the JEM, 2-round HyGT is applied for 4×4 secondary transform and 4-round HyGT is applied for 8×8 secondary transform.

SUMMARY

In an embodiment, there is provided a method of signaling a transform type used to encode a current block in an encoded video bitstream, the method including determining an intra prediction mode of the current block, and determining whether the intra prediction mode satisfies a predetermined condition, wherein in response to determining that the predetermined condition is satisfied, the transform type is signaled in the encoded video bitstream, and in response to determining that the predetermined condition is not satisfied, the transform type comprises a default transform type, and the transform type is not signaled in the encoded video bitstream In an embodiment, there is provided a device for signaling a transform type used to encode a current block in an encoded video bitstream, the device including at least one memory configured to store program code, at least one processor configured to read the program code and operate as instructed by the program code, the program code including first determining code configured to cause the at least one processor to determine an intra prediction mode of the current block, and second determining code configured to cause the at least one processor to determine whether the intra prediction mode satisfies a predetermined condition, wherein: in response to determining that the predetermined condition is satisfied, the transform type is signaled in the encoded video bitstream, and in response to determining that the predetermined condition is not satisfied, the transform type comprises a default transform type, and the transform type is not signaled in the encoded video bitstream.

In an embodiment, there is provided a non-transitory computer-readable medium storing instructions including one or more instructions that, when executed by one or more processors of a device for signaling a transform type used to encode a current block in an encoded video bitstream, cause the one or more processors to determine an intra prediction mode of the current block, and determine whether the intra prediction mode satisfies a predetermined condition, wherein in response to determining that the predetermined condition is satisfied, the transform type is signaled in the encoded video bitstream, and in response to determining that the predetermined condition is not satisfied, the transform type comprises a default transform type, and the transform type is not signaled in the encoded video bitstream.

BRIEF DESCRIPTION OF THE DRAWINGS

Further features, the nature, and various advantages of the disclosed subject matter will be more apparent from the following detailed description and the accompanying drawings in which:

FIG. 5 is a functional block diagram of a video encoder according to an embodiment of the present disclosure.

FIG. 6 is a diagram of a computer system in accordance with an embodiment.

PROBLEM TO BE SOLVED

Figure 1:
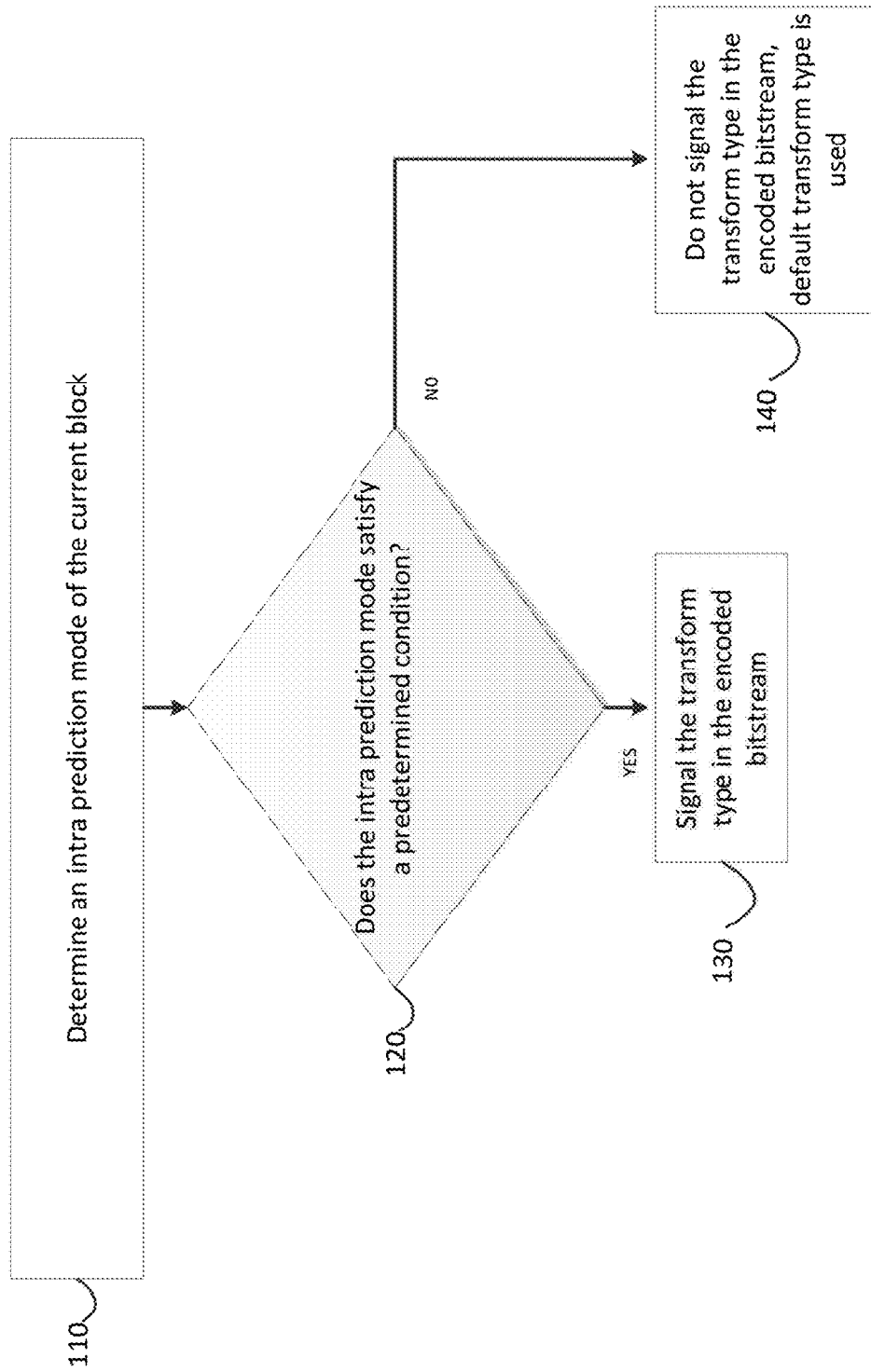
FIG. 1 is a flowchart of an example process for signaling a transform type used to encode a current block in an encoded video bitstream.

EMT and NSST can be used independently or coupled, but they are applied to all intra prediction modes of current block. As a result, each intra prediction mode with EMT or NSST needs to be tested in the encoder, which is time consuming. Moreover, more signaling bits are needed to support the all the combinations of EMT/NSST and intra mode.

Transform skip is applied to all intra prediction modes. As a result, each intra prediction mode with transform skip needs to be tested in the encoder, which is time consuming. Moreover, more signaling bits are needed to support the all the combinations of transform skip and intra mode.

DETAILED DESCRIPTION

Embodiments of the disclosure may be used separately or combined in any order. In the disclosure, the element MPM may refer to any level of MPMs from the lowest level of MPMs to the highest level of MPMs, for example first level MPMs or secondary level MPMs, or any combinations of different levels of MPMs, such as first level MPMs and secondary level MPMs. The embodiments described herein may be be indicated by high-level syntax, e.g., SPS, VPS, PPS, picture header, slice header.

According to an embodiment, a primary transform type may be signaled based on intra prediction mode. In this way, the primary transform type may be signaled only when current intra prediction modes satisfy certain condition. Otherwise, the primary transform type is not signaled and default primary transform such as DCT-2 (or DST-7, or DST-4) may be used.

In an embodiment, primary transform type may be signaled only when current intra prediction mode is equal to, or is not equal to, MPMs of current block. Otherwise, primary transform type is not signaled, and default transform is used for current block. A default transform can be DCT-2, DST-7 or DST-4. The selection of default transform may depend on block width, block height, block width to height ratio, block area size, luma or chroma.

In an embodiment, only horizontal (or vertical) transform type is signaled and default transform is used for vertical (or horizontal) transform when EMT flag is not zero and current intra prediction mode is equal to, or is not equal to, MPMs of current block. Otherwise, both horizontal and vertical transform types are signaled when EMT flag is not zero. A default transform can be DCT-2, DST-7 or DST-4. The selection of default transform may depend on block width, block height, block width to height ratio, block area size, luma or chroma.

In an embodiment, an AMT flag is still signaled for every intra prediction mode, however, only when current intra prediction mode is equal to, or is not equal to, MPMs of a current block, the AMT index is further signaled. When the AMT flag is signaled as 1, but the AMT index is not signaled, the transform type is selected depending on the intra prediction mode, block width, block height, block width to height ratio, block area size, luma or chroma component. When the AMT flag is signaled as 1, but the AMT index is not signaled, the transform type may be pre-defined as DST-7 or DST-4.

In an embodiment, a primary transform type for chroma component is only signaled when current intra prediction mode is equal to DM mode.

In an embodiment, a primary transform type is only signaled for chroma component when current intra prediction mode is not equal to LM, or is equal to LM mode.

According to an embodiment, a secondary transform type may be signaled based on intra prediction mode. In this way, the secondary transform type may be signaled only when current intra prediction modes satisfy certain condition. Otherwise, the secondary transform type is not signaled.

In an embodiment, secondary transform index is only signaled when current intra prediction mode is equal to, or is not equal to, MPMs of current block. Otherwise, secondary transform index is not signaled and is considered to be 0.

In an embodiment, the number of secondary transform is dependent on whether current intra prediction mode is equal to MPMs of current block or not. For example, when current intra prediction mode is equal to MPMs, the number of secondary transform may be 3, and otherwise, the number of secondary transform may be 4. As another example, when current intra prediction mode is not equal to MPMs, the number of secondary transform may be 3, and otherwise, the number of secondary transform may be 4.

In embodiments in which primary and secondary transform are coupled and signaled together, for example CPST, the primary and secondary transform may only be signaled for MPM modes. If primary and secondary transform is not signaled, the default combination, such as DCT-2 for primary transform and no secondary transform, may be used.

In an embodiment, a transform flag, which may be used to indicate whether DCT-2 or a coupled primary and secondary transform is used, may still be signaled for every intra prediction mode, however, only when current intra prediction mode is equal to, or is not equal to, MPMs of current block, the transform index, which may be used to indicate which coupled primary and secondary transform candidate is used, is further signaled.

For example, when a transform flag is signaled as 1, but transform index is not signaled, and the primary and/or secondary transform may be selected depending on the intra prediction mode, block width, block height, block width to height ratio, block area size, luma or chroma component.

As another example, when a transform flag is signaled as 1, but transform index is not signaled, the primary transform type may be pre-defined as DST-7 or DST-4, and the secondary transform may not be applied.

In an embodiment, a primary transform type may be signaled for certain intra prediction modes, for example indicated by M0, and signal secondary transform indices for the certain intra prediction modes, for example indicated by M1.

In one embodiment, the intra prediction modes in M0 are all MPMs, and the intra prediction modes in M1 are not MPMs.

In one embodiment, the intra prediction modes in M0 are not MPMs, and the intra prediction modes in M1 are all MPMs.

In one embodiment, the intra prediction modes in both M0 and M1 are all MPMs.

In one embodiment, the intra prediction modes in neither M0 or M1 are MPMs.

In another embodiment, M0 and M1 do not have any overlap of the intra prediction modes.

In another embodiment, M0 and M1 have partial overlap of the intra prediction modes.

In another embodiment, M0 is equal to M1.

In another embodiment, M0 and M1 together covers all available intra prediction modes.

In an embodiment, a signal transform skip flag may be signaled based on intra prediction mode. In this way, the transform skip flag may be signaled only when current intra prediction modes satisfy certain conditions. Otherwise, the transform skip flag may not be signaled.

In an embodiment, transform skip flag is only signaled when current intra prediction mode is equal to, or is not equal to, MPMs of current block. Otherwise, transform skip flag is not signaled, and transform skip flag is considered to be zero.

In an embodiment, a generic intra mode dependent tool signaling may be used. For example, tool X may be signaled only for MPM mode. When tool X is not signaled, it is inferred to be off. In an embodiment, X may be bilateral filtering, as proposed in JVET-F0034. In another embodiment, X may be PDPC (Position Dependent Prediction Combination) based on explicit signalling.

In an embodiment, the MPM flag value may be used as the context for entropy coding of primary transform related syntaxes, secondary transform related syntaxes, and/or coupled primary and secondary transform related syntaxes.

In an embodiment, the primary transform related syntaxes, secondary transform related syntaxes, and/or coupled primary and secondary transform related syntaxes may be signaled before intra prediction modes.

For example, the primary transform, secondary transform, and/or CPST related syntax values may be used as the context for entropy coding of MPM flags, MPM indices, secondary MPM flags, secondary MPM indices, non-MPM indices.

For certain values of primary transform, secondary transform, and/or CPST related syntax, only MPM, or secondary MPM, or non-MPM may be used, therefore the related syntax (e.g., MPM flag, secondary MPM flag) can be avoided as implicitly derived.

The number of available intra prediction mode may depend on the values of primary transform related syntaxes, secondary transform related syntaxes, and/or coupled primary and secondary transform related syntaxes.

The number of MPMs may depend on the values of primary transform related syntaxes, secondary transform related syntaxes, and/or coupled primary and secondary transform related syntaxes.

FIG. 1 is a flowchart of an example process 100 for signaling a transform type used to encode a current block in an encoded video bitstream. In some implementations, one or more process blocks of FIG. 1 may be performed by a decoder. In some implementations, one or more process blocks of FIG. 1 may be performed by another device or a group of devices separate from or including a decoder, such as an encoder.

As shown in FIG. 1, process 100 may include determining an intra prediction mode of a current block (block 110). As further shown in FIG. 1, process 100 may include determining whether the intra prediction mode satisfies a predetermined condition (block 120). As further shown in FIG. 1, process 100 may include signaling the transform type in response to determining that the predetermined condition is satisfied (block 130). As further shown in FIG. 1, process 100 may include not signaling the transform type in response to determining that the predetermined condition is not satisfied, and using a default transform type (block 140).

In an embodiment, the transform type includes at least one from among a primary transform type or a secondary transform type.

In an embodiment, the predetermined condition is satisfied when the intra prediction mode is a Most Probable Mode (MPM) of the current block.

In an embodiment, in response to determining that the intra prediction mode is an MPM of the current block, an MPM flag is signaled in the encoded video bitstream.

In an embodiment, a value of the MPM flag is used as a context for entropy coding of at least one from among primary transform related syntaxes, secondary transform related syntaxes, or coupled primary and secondary transform related syntaxes.

In an embodiment, the default transform type is selected based on at least one from among a block width, a block height, a ratio of the block width and the block height, a block area size, a luma component, or a chroma component.

In an embodiment, the default transform type includes at least one from among DCT-2, DST-7, or DST-4.

In an embodiment, the predetermined condition is satisfied when the intra prediction mode is a DM mode, and the transform type includes a primary transform type for a chroma component.

In an embodiment, the predetermined condition is satisfied when the intra prediction mode is not an LM mode, and the transform type includes a primary transform type for a chroma component.

In an embodiment, in response to determining that the predetermined condition is satisfied, a transform skip flag is signaled in the encoded video bitstream Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

Figure 2:
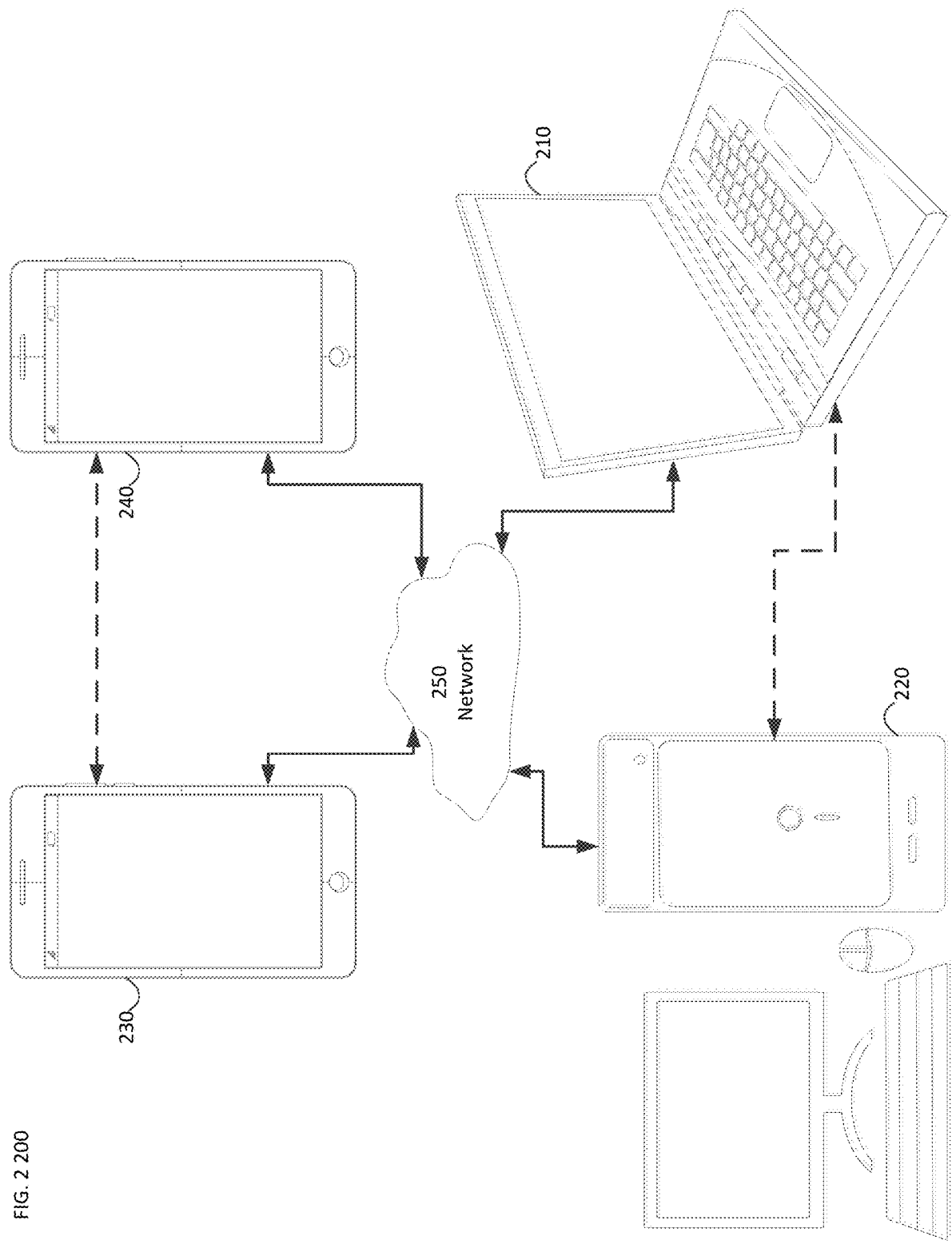
FIG. 2 is a simplified block diagram of a communication system according to an embodiment of the present disclosure.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
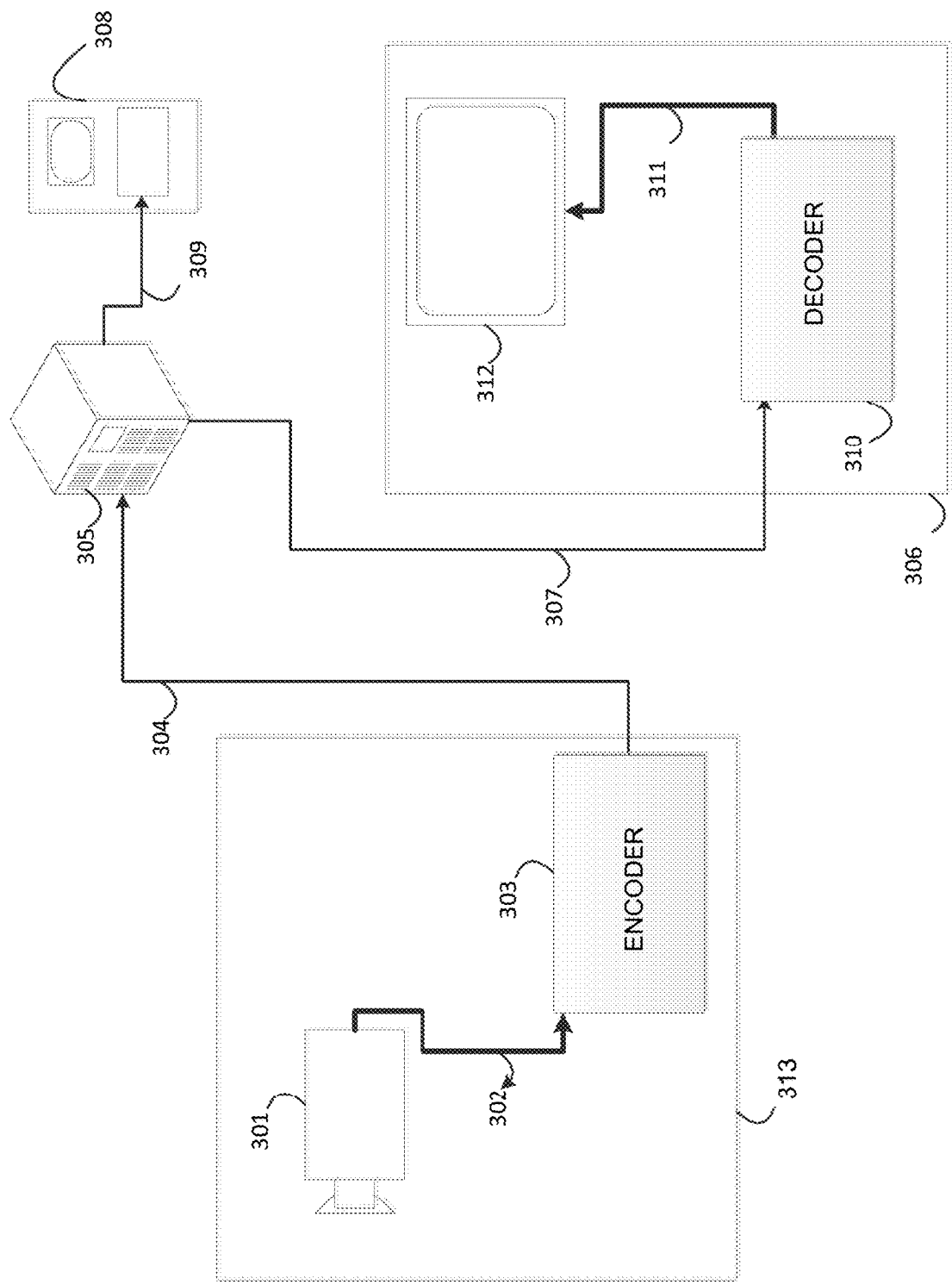
FIG. 3 is a diagram of the placement of a video encoder and decoder in a streaming environment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 4:
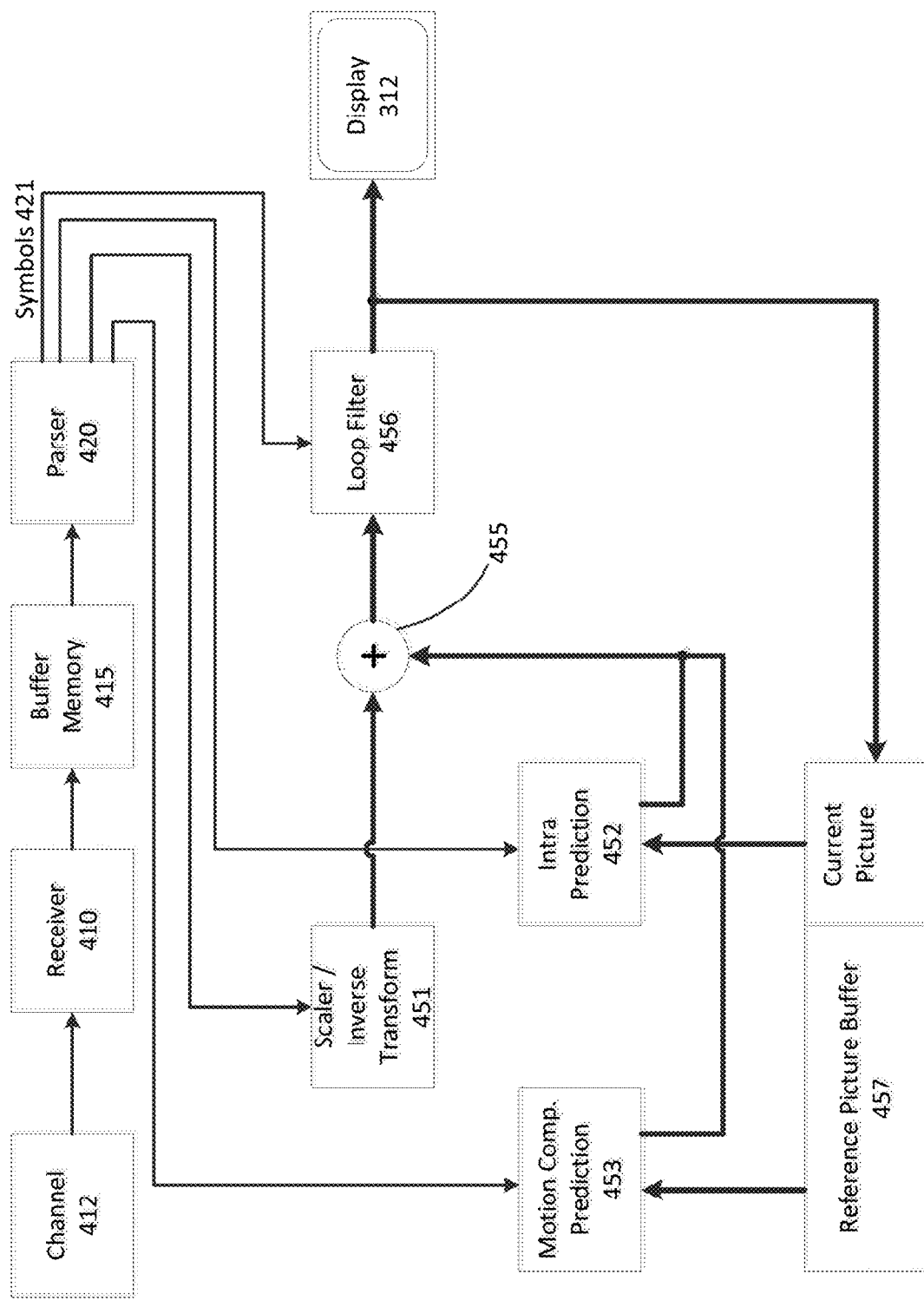
FIG. 4 is a functional block diagram of a video decoder according to an embodiment of the present disclosure.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an over-simplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610 which may be connected to graphics adapter 650, data-glove 1204, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 1204, or joystick 605, but there can also be tactile feedback devices that do not serve as input devices), audio output devices (such as: speakers 609, headphones (not depicted)), visual output devices (such as screens 610 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example universal serial bus (USB) ports of the computer system 600; others are commonly integrated into the core of the computer system 600 by attachment to a system bus as described below (for example Ethernet interface into a PC computer system or cellular network interface into a smartphone computer system). As an example, network 655 may be connected to peripheral bus 649 using network interface 654. Using any of these networks, computer system 600 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 600.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory (RAM) 646, internal mass storage such as internal non-user accessible hard drives, solid-state drives (SSDs), and the like 647, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 649. Architectures for a peripheral bus include peripheral component interconnect (PCI), USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of signaling a transform type used to encode a current block in an encoded video bitstream, the method comprising:
   determining an intra prediction mode of the current block;
   determining whether the intra prediction mode satisfies a predetermined condition; and
   determination whether to signal the transform type in the encoded video bitstream based on whether the predetermined condition is satisfied, wherein:
in response to determining that the predetermined condition is satisfied, the transform type is signaled in the encoded video bitstream, and in response to determining that the predetermined condition is not satisfied, the transform type comprises a default transform type, and the transform type is not signaled in the encoded video bitstream.

2. The method of claim 1, wherein the transform type comprises at least one from among a primary transform type or a secondary transform type.

3. The method of claim 1, further comprising determining that the predetermined condition is satisfied when the intra prediction mode is a Most Probable Mode (MPM) of the current block.

4. The method of claim 3, wherein in response to determining that the intra prediction mode is an MPM of the current block, an MPM flag is signaled in the encoded video bitstream.

5. The method of claim 4, wherein a value of the MPM flag is used as a context for entropy coding of at least one from among primary transform related syntaxes, secondary transform related syntaxes, or coupled primary and secondary transform related syntaxes.

6. The method of claim 1, wherein the default transform type is selected based on at least one from among a block width, a block height, a ratio of the block width and the block height, a block area size, a luma component, or a chroma component.

7. The method of claim 1, wherein the default transform type comprises at least one from among DCT-2, DST-7, or DST-4.

8. The method of claim 1, further comprising determining that the predetermined condition is satisfied when the intra prediction mode is a direct mode (DM mode),
wherein the transform type comprises a primary transform type for a chroma component.

9. The method of claim 1, further comprising determining that the predetermined condition is satisfied when the intra prediction mode is not a linear model (LM) mode,
wherein the transform type comprises a primary transform type for a chroma component.

10. The method of claim 1, wherein in response to determining that the predetermined condition is satisfied, a transform skip flag is signaled in the encoded video bitstream.

11. A device for signaling a transform type used to encode a current block in an encoded video bitstream, the device comprising:
at least one memory configured to store program code;
at least one processor configured to read the program code and operate as instructed by the program code, the program code including:
first determining code configured to cause the at least one processor to determine an intra prediction mode of the current block;
second determining code configured to cause the at least one processor to determine whether the intra prediction mode satisfies a predetermined condition; and
third determining code configured to cause the at least one processor to determine whether to signal the transform type in the ended video bitstream based on whether the predetermined condition is satisfied, wherein:
in response to determining that the predetermined condition is satisfied, the transform type is signaled in the encoded video bitstream, and in response to determining that the predetermined condition is not satisfied, the transform type comprises a default transform type, and the transform type is not signaled in the encoded video bitstream.

12. The device of claim 11, wherein the transform type comprises at least one from among a primary transform type or a secondary transform type.

13. The device of claim 11, wherein the predetermined condition is satisfied when the intra prediction mode is a Most Probable Mode (MPM) of the current block.

14. The device of claim 13, wherein in response to determining that the intra prediction mode is an MPM of the current block, an MPM flag is signaled in the encoded video bitstream.

15. The device of claim 14, wherein a value of the MPM flag is used as a context for entropy coding of at least one from among primary transform related syntaxes, secondary transform related syntaxes, or coupled primary and secondary transform related syntaxes.

16. The device of claim 11, wherein the default transform type is selected based on at least one from among a block width, a block height, a ratio of the block width and the block height, a block area size, a luma component, or a chroma component.

17. The device of claim 11, wherein the predetermined condition is satisfied when the intra prediction mode is a direct mode (DM mode), and
wherein the transform type comprises a primary transform type for a chroma component.

18. The device of claim 11, wherein the predetermined condition is satisfied when the intra prediction mode is not an linear model (LM) mode, and wherein the transform type comprises a primary transform type for a chroma component.

19. The device of claim 11, wherein in response to determining that the predetermined condition is satisfied, a transform skip flag is signaled in the encoded video bitstream.

20. A non-transitory computer-readable medium storing instructions, the instructions comprising: one or more instructions that, when executed by one or more processors of a device for signaling a transform type used to encode a current block in an encoded video bitstream, cause the one or more processors to:
determine an intra prediction mode of the current block;
determine whether the intra prediction mode satisfies a predetermined condition, and
determine whether to signal the transform type in the encoded video bitstream based on whether the predetermined condition is satisfied,
wherein
in response to determining that the predetermined condition is satisfied, the transform type is signaled in the encoded video bitstream, and in response to determining that the predetermined condition is not satisfied, the transform type comprises a default transform type, and the transform type is not signaled in the encoded video bitstream.

21. The method of claim 1, wherein in response to determining that the predetermined condition is satisfied, the transform type comprises a first transform type, and
wherein the first transform type is different from the default transform type.

* * * * *